(12) United States Patent
Jeong et al.

(10) Patent No.: US 10,957,931 B2
(45) Date of Patent: Mar. 23, 2021

(54) MEMBRANE ELECTRODE ASSEMBLY MANUFACTURING DEVICE AND MANUFACTURING METHOD THEREOF

(71) Applicants: HYUNDAI MOTOR COMPANY, Seoul (KR); KIA MOTORS CORPORATION, Seoul (KR)

(72) Inventors: Sung Hoon Jeong, Anyang-si (KR); Jongcheol Ahn, Seoul (KR); Yongmin Kim, Seongnam-si (KR); Ki Sub Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/555,494

(22) Filed: Aug. 29, 2019

(65) Prior Publication Data
US 2019/0386325 A1  Dec. 19, 2019

Related U.S. Application Data

(62) Division of application No. 15/172,984, filed on Jun. 3, 2016, now Pat. No. 10,439,243.

(30) Foreign Application Priority Data

Sep. 9, 2015 (KR) .................... 10-2015-0127935

(51) Int. Cl.
  *H01M 8/1004* (2016.01)
  *B32B 37/00* (2006.01)
  *H01M 4/88* (2006.01)

(52) U.S. Cl.
  CPC ....... *H01M 8/1004* (2013.01); *B32B 37/0053* (2013.01); *B32B 2457/18* (2013.01); *H01M 4/8896* (2013.01); *Y02P 70/50* (2015.11)

(58) Field of Classification Search
  CPC .. B32B 37/0053; B32B 2457/18; H01M 8/10; H01M 4/1004; H01M 4/8896
  See application file for complete search history.

(56) References Cited

U.S. PATENT DOCUMENTS

2003/0190521 A1\* 10/2003 Schukar .............. H01M 8/1093
  429/178
2004/0173072 A1\* 9/2004 Ishii .................... H01M 8/2404
  83/100

(Continued)

FOREIGN PATENT DOCUMENTS

JP   2009-038040 A   2/2009
JP   2009-043549 A   2/2009

(Continued)

OTHER PUBLICATIONS

Office Action issued in corresponding Japanese Patent Application No. 2016-134765 dated Jan. 28, 2020, with English translation.

(Continued)

*Primary Examiner* — Ula C Ruddock
*Assistant Examiner* — Matthew W Van Oudenaren
(74) *Attorney, Agent, or Firm* — Morgan, Lewis & Bockius LLP (57) ABSTRACT

A membrane electrode assembly manufacturing device includes a loading apparatus for supplying an MEA roll on which a membrane electrode assembly is arranged by a predetermined pitch, a hot press apparatus for pressing a surface corresponding to the membrane electrode assembly of the MEA roll at a set temperature, a buffer apparatus to which the MEA roll is supplied to one side and exhausted at the other side, and for performing a buffer function of absorbing a difference between supply and exhaustion, and a cutting apparatus for cutting a portion of the membrane electrode assembly arranged at the MEA roll.

4 Claims, 7 Drawing Sheets

(56) References Cited

U.S. PATENT DOCUMENTS

2007/0116999 A1     5/2007   Kuramochi et al.
2009/0255632 A1    10/2009   Park
2014/0305596 A1    10/2014   Ahn

FOREIGN PATENT DOCUMENTS

| JP | 2010-205676 A | | 9/2010 |
|---|---|---|---|
| JP | 2010-251136 A | | 11/2010 |
| JP | 2011-28915 A | | 2/2011 |
| JP | 2014-082049 A | | 5/2014 |
| JP | 2014-86132 A | | 5/2014 |
| JP | 2015-56255 A | | 3/2015 |
| KR | 10-2008-0008855 A | | 1/2008 |
| KR | 1020080008855 | * | 1/2008 |
| KR | 10-2010-0116790 A | | 11/2010 |
| KR | 10-2012-0117266 A | | 10/2012 |

OTHER PUBLICATIONS

Notice of Allowance issued in corresponding U.S. Appl. No. 15/172,984 dated May 31, 2019.
Non-Final Office Action issued in corresponding U.S. Appl. No. 15/172,984 dated Feb. 7, 2019.
Extended European Search Report dated Jan. 24, 2017, issued in European Patent Application No. 16173934.7.

* cited by examiner

MEMBRANE ELECTRODE ASSEMBLY MANUFACTURING DEVICE AND MANUFACTURING METHOD THEREOF

CROSS-REFERENCE TO RELATED APPLICATION

This application is a Divisional Application of U.S. patent application Ser. No. 15/172,984, filed Jun. 3, 2016, now allowed, which claims the benefit of priority to Korean Patent Application No. 10-2015-0127935, filed with the Korean Intellectual Property Office on Sep. 9, 2015, the entire contents of which are incorporated herein by reference.

TECHNICAL FIELD

An exemplary embodiment of the present disclosure relates to a membrane electrode assembly manufacturing device sequentially manufacturing a membrane-electrode assembly (MEA) including an electrolyte film, an electrode, and a sub-gasket, and a manufacturing method of the membrane electrode assembly.

BACKGROUND

As conventional energy resources such as petroleum and coal may soon run out, interest regarding energy sources which may substitute for them has increased. For an example, a fuel cell is particularly being researched because of merits of high efficiency and an absence of exhaust pollution materials such as NOx and SOx, and a usable fuel therein is abundant.

The fuel cell is an electric generator system that converts chemical reactive energy of a fuel and an oxidizing agent to electrical energy. Typically, hydrogen or methanol is used as the fuel, and oxygen is used as the oxidizing agent.

Figure 1:
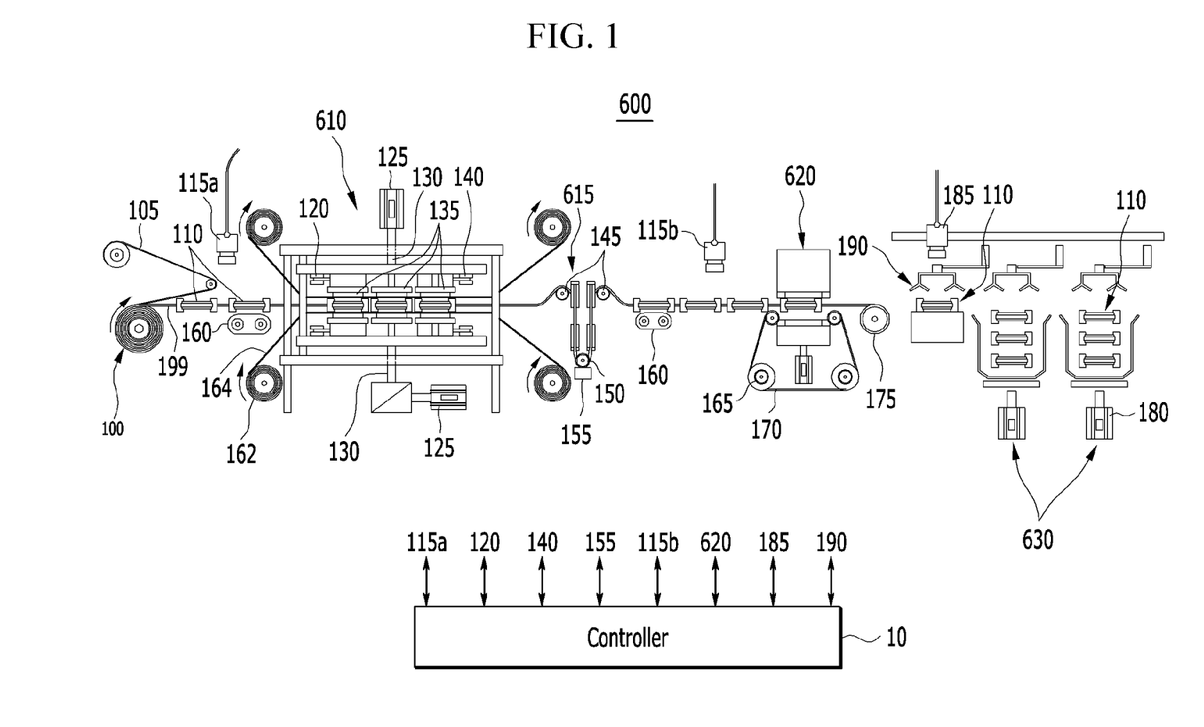
FIG. 1 is a schematic side view of a membrane electrode assembly manufacturing device according to an exemplary embodiment of the present disclosure.

In the fuel cell, the most basic unit generating electricity is a membrane-electrode assembly (MEA), and this consists of electrolyte film, and an anode and a cathode formed at respective surfaces of the electrolyte film. Referring to FIG. 1 and Reaction Formula 1 (a reaction formula of a fuel cell when hydrogen is used as a fuel) indicating an electrical generation principle, an oxidation reaction of the fuel and oxygen (oxidizing agent) occurs at the anode electrode to generate a hydrogen ion and an electron, the hydrogen ion moves to the cathode electrode through the electrolyte film, the hydrogen ion is transferred through the electrolyte membrane, and the electron reacts at the cathode electrode to generate water. By this reaction, the electron moves to an external circuit.

anode electrode: $H_2 \rightarrow 2H^+ + 2e$ cathode electrode: $1/2O^2 + 2H^+ + 2e- \rightarrow H_2O$ whole reaction formula: $H_2 + 1/2O^2 \rightarrow H_2O$     Reaction Formula 1

In a manufacturing process of the membrane-electrode assembly, the membrane-electrode assembly has been produced by attaching a protection membrane to both surfaces of the electrolyte membrane, and hot compressing the anode electrode (fuel pole) to which a catalytic layer is applied and the cathode electrode (air pole). This process has a discontinuity property because respective components are manufactured by respective steps and by manual labor. Also, it is difficult to standardize performance because of operation errors occurring due to the manual labor inputs. Thereby, the discontinuous manufacturing process has a low production speed, and it is too difficult to control factors determining performance.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a membrane electrode assembly manufacturing device having advantages of improving productivity by automating a membrane electrode assembly manufacturing process to be successive and minimizing performance deviation by standardizing performance of the manufactured membrane electrode assembly.

A membrane electrode assembly manufacturing device according to an exemplary embodiment of the present disclosure may include a loading apparatus supplying an MEA roll on which a membrane electrode assembly is arranged by a predetermined pitch, a hot press apparatus pressing a surface corresponding to the membrane electrode assembly of the MEA roll at a set temperature, a buffer apparatus with which the MEA roll is supplied to one side and exhausted to the other side, and performing a buffer function of absorbing a difference between supply and exhaustion, and a cutting apparatus cutting a portion of the membrane electrode assembly arranged at the MEA roll.

The loading apparatus may include an unwinder roller to which the MEA roll is wound, and disposed to loosen and supply the MEA roll, and a rewinder roller passing through the hot press apparatus, the buffer apparatus, and the cutting apparatus, and disposed to wind the roll from which the membrane electrode assembly is cut.

The hot press apparatus may include a hot plate pressing the membrane electrode assembly at a set temperature, a position detecting sensor detecting a pitch of the membrane electrode assembly disposed at the MEA roll, and a variable pitch portion varying a position of the hot plate according to the pitch of the membrane electrode assembly detected by the position detecting sensor.

The buffer apparatus may include a reference roller disposed in a moving direction by a pitch, a buffer roller disposed so that a distance from the reference roller is adjusted, and a buffer driver disposed so that a distance between the reference roller and the buffer roller is adjusted.

The cutting apparatus may include a cutter disposed to cut the membrane electrode assembly of the MEA roll, and a cutter mount bracket at which the cutter is fixed.

The cutting apparatus may include an up-down member disposed by a predetermined pitch with the cutter and on which the membrane electrode assembly is interposed, an up-down driver to operate the up-down member to upper and lower sides, and a protection file disposed between the membrane electrode assembly and the up-down member to protect the membrane electrode assembly or the up-down member from the cutter.

The device may include a position detecting sensor detecting a position of the membrane electrode assembly at the MEA roll entering the cutting apparatus, and the up-down driver operates according to a position of the membrane electrode assembly detected by the position detecting sensor.

The device may include an unloading apparatus unloading and loading the cut membrane electrode assembly.

The unloading apparatus may include a gripper attaching and unloading the cut membrane electrode assembly, and a stack apparatus on which the membrane electrode assembly is sequentially stacked at the gripper.

The unloading apparatus may further include a measurement detecting sensor detecting measurement of the membrane electrode assembly cut by the cutting apparatus, and the membrane electrode assembly may be classified according to a characteristic of the membrane electrode assembly detected by the measurement detecting sensor.

The gripper may be a vacuum adsorption type that takes in air and adsorbs one surface of the membrane electrode assembly.

The device may further include a rail guiding movement of the buffer roller in a predetermined direction.

The hot plate may include a variable hot plate disposed in a moving direction of the MEA roll by a predetermined pitch and a reference hot plate, the variable pitch portion may adjust a position of the variable hot plate with reference to the reference hot plate, and the reference hot plate and the variable hot plate may press the membrane electrode assembly at the same time.

A membrane electrode assembly manufacturing method according to an exemplary embodiment of the present disclosure may include loading an MEA roll on which a membrane electrode assembly is arranged, hot pressing an area corresponding to the membrane electrode assembly at the loaded MEA roll, cutting the hot pressed membrane electrode assembly at the MEA roll, and unloading the cut membrane electrode assembly to stack it on a stack apparatus.

The method may further include detecting a pitch of the membrane electrode assembly disposed on the MEA roll, and adjusting a pitch of a hot plate of the hot press apparatus according to the detected pitch of the membrane electrode assembly.

The method may further include detecting a pitch of the membrane electrode assembly disposed on the MEA roll, and cutting the membrane electrode assembly according to the detected pitch of the membrane electrode assembly.

The method may further include detecting a measurement of the cut membrane electrode assembly, and classifying and loading the membrane electrode assembly according to the detected measurement of the membrane electrode assembly.

The method may further include temporarily storing the MEA roll on which the hot pressed membrane electrode assembly is arranged.

In an exemplary embodiment of the present disclosure, productivity may be improved by an entire process such as hot pressing the membrane electrode assembly of the fuel cell and successively cutting and loading a roll, and performance deviation may be minimized by standardizing performance of the manufactured membrane electrode assembly.

BRIEF DESCRIPTION OF THE DRAWINGS

While the drawings are described in connection with what is presently considered to be practical exemplary embodiments, it is to be understood that the disclosure is not limited to the disclosed drawings.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

A part that is irrelevant to the description will be omitted to clearly describe the present disclosure, and the same or similar elements will be designated by the same or similar reference numerals throughout the specification.

The size and thickness of each configuration shown in the drawings may be shown for better understanding and ease of description, but the present disclosure is not limited thereto, and the thicknesses of portions and regions may be exaggerated for clarity.

Further, in the following detailed description, names of constituent elements, which are in the same relationship, are divided into "first", "second", and the like, but the present disclosure is not limited to the order in the following description.

Throughout the specification and the claims, unless explicitly described to the contrary, the word "comprise" and variations such as "comprises" or "comprising" will be understood to imply the inclusion of stated elements but not the exclusion of any other elements.

FIG. 1 is a schematic side view of a membrane electrode assembly manufacturing device according to an exemplary embodiment of the present disclosure.

Referring to FIG. 1, the membrane electrode assembly manufacturing device 600 may include an unwinder roller 100, a roll film 105, a membrane electrode assembly 110, a first position detecting sensor 115a, a variable pitch portion 120, a hot press apparatus 610, a press cylinder 125, a rod 130, a hot plate 135, a buffer apparatus 615, a reference roller 145, a buffer roller 150, a buffer roller moving portion 155, a second position detecting sensor 115b, a cutting apparatus 620, an unloading gripper 190, a measurement detecting sensor 185, a lifting portion 180, a stack apparatus 630, a rewinder roller 175, a cutting protection film 170, a cutting film roller 165, a meandering controller 160, a protection film 164, a protection film roller 162 and an MEA roll 199.

The MEA roll 199 may be wound at the unwinder roller 100, and the membrane electrode assembly 110 may be arranged on the MEA roll 199 by a predetermined pitch. The membrane electrode assembly 110 may have an electrolyte film on which electrodes and gaskets are formed. A detailed structure of the membrane electrode assembly 110 is well-known and therefore a detailed description thereof will be omitted.

The rewinder roller 175 may be disposed by a predetermined distance with the unwinder roller 100. The hot press apparatus 610, the buffer apparatus 615, the cutting apparatus 620, and the unloading apparatus may be sequentially disposed between the unwinder roller 100 and the rewinder roller 175, and the order can be varied.

The roll film 105 may be attached on one side surface of the MEA roll 199. The roll film 105 may be detached before entering the hot press apparatus 610, and the MEA roll 199 from which the roll film 105 is detached may enter the hot press apparatus 610.

Protection film rollers 162 may be respectively disposed at an inlet side and an outlet side of the hot press apparatus 610, and the protection film 164 may be attached on both side surfaces of the MEA roll 199 and detached from both side surfaces of the MEA roll 199 at the outlet side.

The meandering controller 160 may control a moving direction of the roll so that the MEA roll 199 normally enters, and the first position detecting sensor 115a may detect a pitch of the membrane electrode assembly 110 disposed on the MEA roll 199.

In the hot press apparatus 610, three hot plates 135 may be disposed upwardly and downwardly by a predetermined pitch, and the press cylinder 125 may be disposed to press the hot plates 135 through the rod 130. Further, the variable pitch portion 120 adjusting pitches of forward and rearward hot plates of the three hot plates 135 is disposed in the hot press apparatus 610.

The variable pitch portion 120 may control a position of at least one hot plate 135 of the hot plates 135 according to the pitch of the membrane electrode assembly 110, therefore the hot plates 135 can press the membrane electrode assembly 110 more precisely.

The buffer apparatus 615 may be disposed rearward of the hot press apparatus 610. The buffer apparatus 615 may temporarily store the MEA roll 199 drawn out from the hot press apparatus 610 and may uniformly supply the MEA roll 199 to the cutting apparatus 620.

The buffer apparatus 615 may include the reference roller 145 disposed at an upper portion, the buffer roller 150 disposed at a lower portion, and the buffer roller moving portion 155 disposed to move the buffer roller 150 upward and downward.

The meandering controller 160 and the second position detecting sensor 115b may be disposed rearward of the buffer apparatus 615, and the cutting apparatus 620 may be disposed to cut the membrane electrode assembly 110 disposed on the MEA roll 199.

The second position detecting sensor 115b may be disposed forward of the cutting apparatus 620. The second position detecting sensor 115b may detect a pitch of the membrane electrode assembly 110 formed on the MEA roll 199, and the cutting apparatus 620 may operate according to the detected pitch.

The cutting apparatus 620 may include the cutting film roller 165 supplying the cutting protection film 170 to the surface of the lower portion of the MEA roll 199 and the cutter (500' in FIG. 5), the detailed structure of which is described with reference to FIG. 5.

The unloading gripper 190 may grip and move the membrane electrode assembly 110 cut by the cutting apparatus 620, and the measurement detecting sensor 185 may detect measurements and a shape of the membrane electrode assembly 110 that is moved by the unloading gripper 190.

Further, the membrane electrode assembly 110 may be classified as a membrane electrode assembly within a predetermined condition and a membrane electrode assembly above the predetermined condition to be stacked on the stack apparatus 630. The stack apparatus 630 may include the lifting portion 180 lifting the stacked membrane electrode assembly 110.

In an exemplary embodiment of the present disclosure, the controller 10 controls the variable pitch portion 120 (and 140) according to the pitch of the membrane electrode assembly 110 detected by the first position detecting sensor 115a, and performs a hot pressing process.

Further, the controller 10 may control the buffer roller moving portion 155 to control the position of the buffer roller 150 upwardly and downwardly, make the MEA 199 having a suitable tension, and store and temporarily store the MEA roll 199 at the buffer unit.

The controller 10 also may control the cutting apparatus 620 according to the pitch of the membrane electrode assembly 110 detected by the second position detecting sensor 115b to precisely cut the membrane electrode assembly 110 at the MEA roll 199.

The controller 10 may control the unloading gripper 190 according to a measurement characteristic detected by the measurement detecting sensor 185 to separate the cut the membrane electrode assembly 110 and stack it on the stack apparatus 630.

The controller 10 may be realized as at least one microprocessor operated by a predetermined program, and the predetermined program can be programmed to include a set of instructions to perform steps in a method according to the exemplary embodiment of the present disclosure, which will be described later in more detail.

Figure 2:
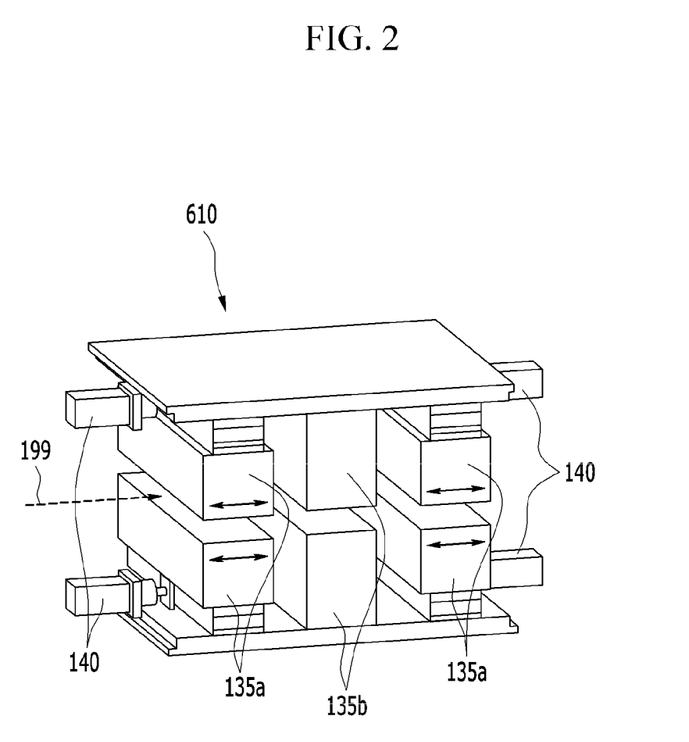
FIG. 2 is a schematic perspective view of a hot press apparatus of the membrane electrode assembly manufacturing device according to an exemplary embodiment of the present disclosure.

FIG. 2 is a schematic perspective view of a hot press apparatus of a membrane electrode assembly manufacturing device according to an exemplary embodiment of the present disclosure.

Referring to FIG. 2, the hot press apparatus 610 may include a reference hot press apparatus 135b and variable hot plates 135a disposed upwardly and downwardly, and the variable hot plates 135a may be disposed upwardly and downwardly with respect to the reference hot plate 135b by a predetermined pitch both forward and rearward.

The variable pitch portion 120 may be disposed to adjust a distance between the variable hot plate 135a and the reference hot plate 135b by pulling or pushing the variable hot plate 135a using a rotational force of a motor.

Figure 3:
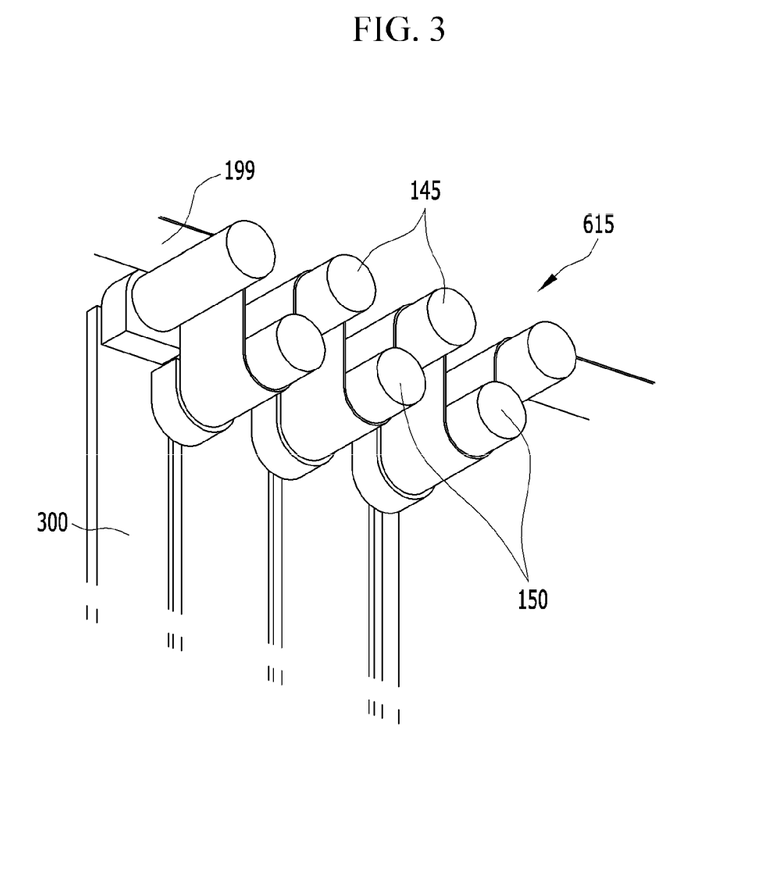
FIG. 3 and FIG. 4 are schematic perspective views of a buffer apparatus of the membrane electrode assembly manufacturing device.
Figure 4:
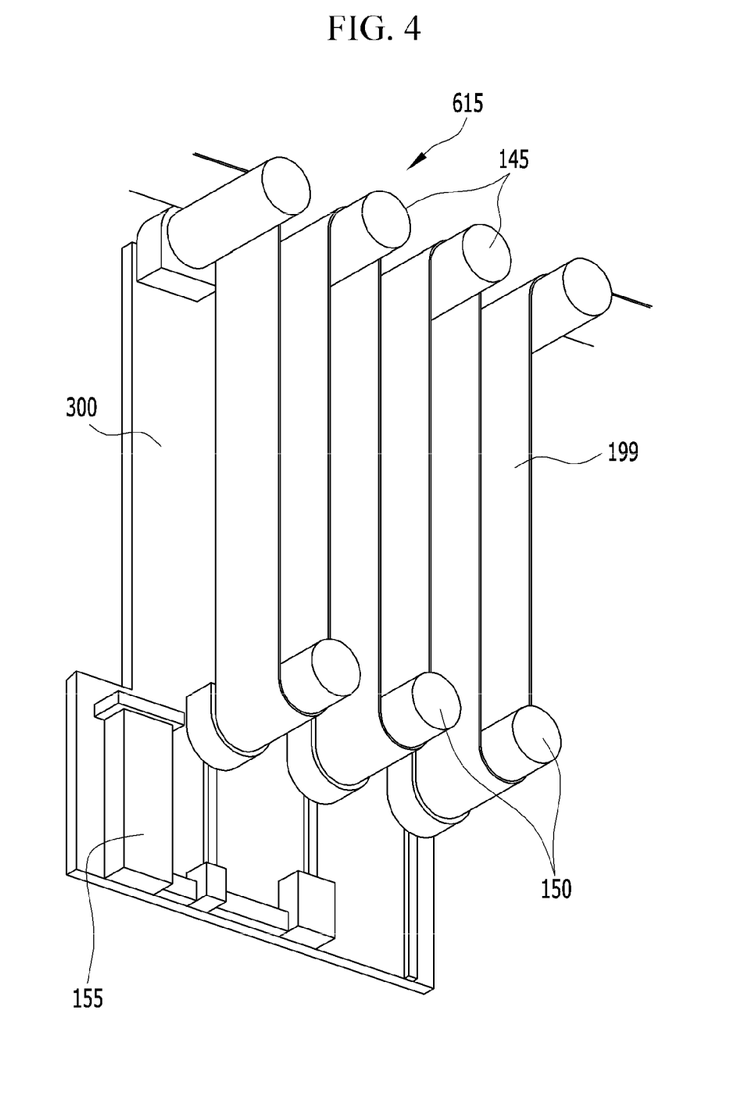

FIG. 3 and FIG. 4 are schematic perspective views of a buffer apparatus of the membrane electrode assembly manufacturing device.

Referring to FIG. 3 and FIG. 4, the buffer apparatus 615 may include the reference roller 145, the buffer roller 150, and a rail 300. The reference roller 145 may be disposed on the upper end portion of the rail 300, the buffer roller 150 may be disposed on the lower end portion of the reference roller 145, and the buffer roller 150 may be disposed to move upwardly and downwardly along the rail 300.

The buffer roller moving portion 155 may be disposed at the lower end portion of the rail, and vary the upward and downward position of the buffer roller 150. Accordingly, the length of the MEA roll 199 disposed between the reference roller 145 and the buffer roller 150 may be variable.

Figure 5:
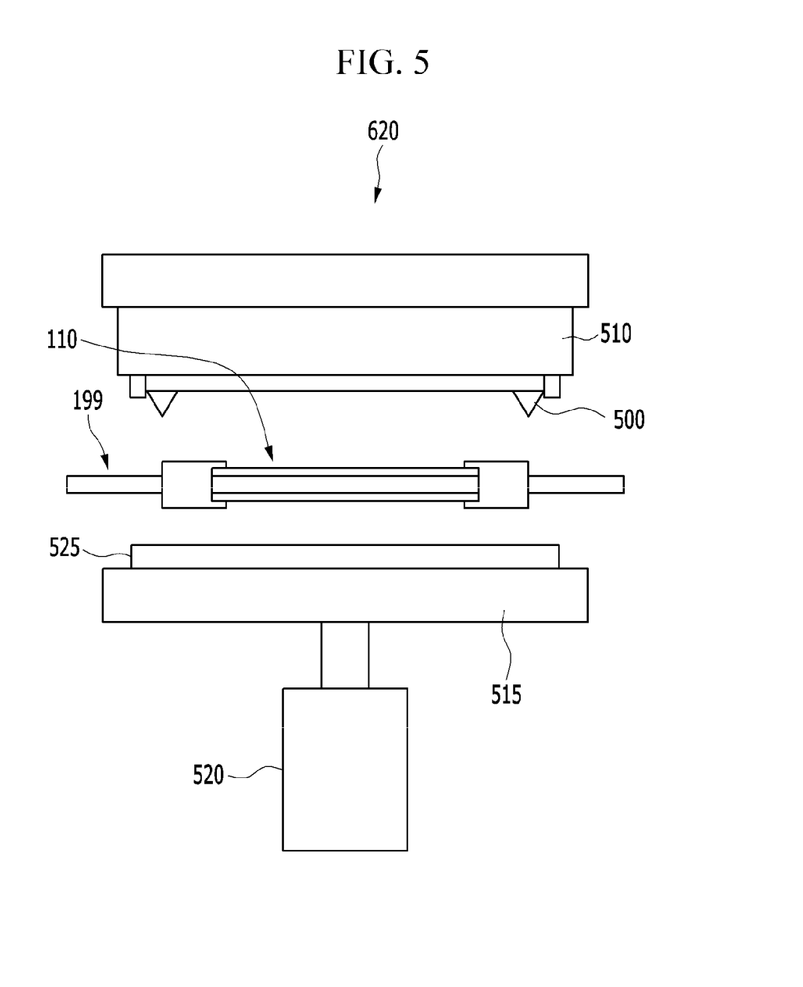
FIG. 5 is a schematic perspective view of a cutting apparatus of the membrane electrode assembly manufacturing device.

FIG. 5 is a schematic perspective view of a cutting apparatus of the membrane electrode assembly manufacturing device.

Referring to FIG. 5, the cutting apparatus may include an up-down driver 520, an up-down member 515, the cutter 500 and a mount bracket 510.

The cutter 500 may be disposed on the lower surface of the mount bracket 510, and the up-down member 515 may be disposed on the lower portion of the mount bracket 510 by a predetermined distance. The up-down member 515 may be disposed to move upwardly and downwardly by the up-down driver 520.

The MEA roll 199 may be disposed between the up-down member 515 and the cutter 500, and a cutting protection film 525 may be disposed between the MEA roll 199 and the up-down member 515.

When the up-down driver 520 lifts the up-down member 515, the up-down member 515 may elevate the MEA roll 199 with the cutting protection film 525, and the membrane electrode assembly 110 of the MEA roll 199 may be cut by the cutter 500.

Figure 6:
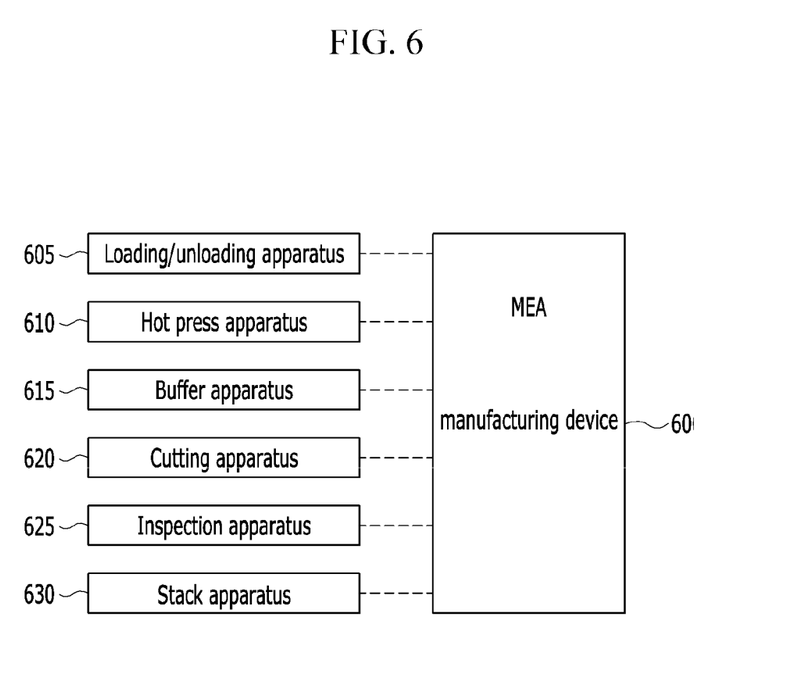
FIG. 6 is a schematic diagram of the membrane electrode assembly manufacturing device according to an exemplary embodiment of the present disclosure.

FIG. 6 is a schematic diagram of the membrane electrode assembly manufacturing device according to an exemplary embodiment of the present disclosure.

Referring to FIG. 6, the membrane electrode assembly manufacturing device may include a loading/unloading apparatus 605, the hot press apparatus 610, the buffer apparatus 615, the cutting apparatus 620, an inspection apparatus 625 and the stack apparatus 630.

The loading/unloading apparatus may include at least one of the unwinder roller 100, the rewinder roller 175, and the unloading gripper 190 illustrated in FIG. 1, and the hot press apparatus 610 may include at least one of the rod 130, the hot plate 135, the variable hot plate 135a, the reference hot plate 135b, and the variable pitch portion 120 illustrated in FIG. 1 and FIG. 2.

The buffer apparatus may include at least one of the reference roller 145, the buffer roller 150, the rail 300, and the buffer roller driver 155 illustrated in FIG. 3 and FIG. 4, and the cutting apparatus may include at least one of the mount bracket 510, the cutter 50, the cutting protection film 170, the up-down member 511, and the up-down driver 520 illustrated in FIG. 5.

The inspection apparatus 625 may include at least one of the first and second position detecting sensors 115a and 115b and the measurement detecting sensor 185, and the stack apparatus 630 may include at least one of the lifting portion 180 with which the membrane electrode assembly 110 is classified and stacked.

Figure 7:
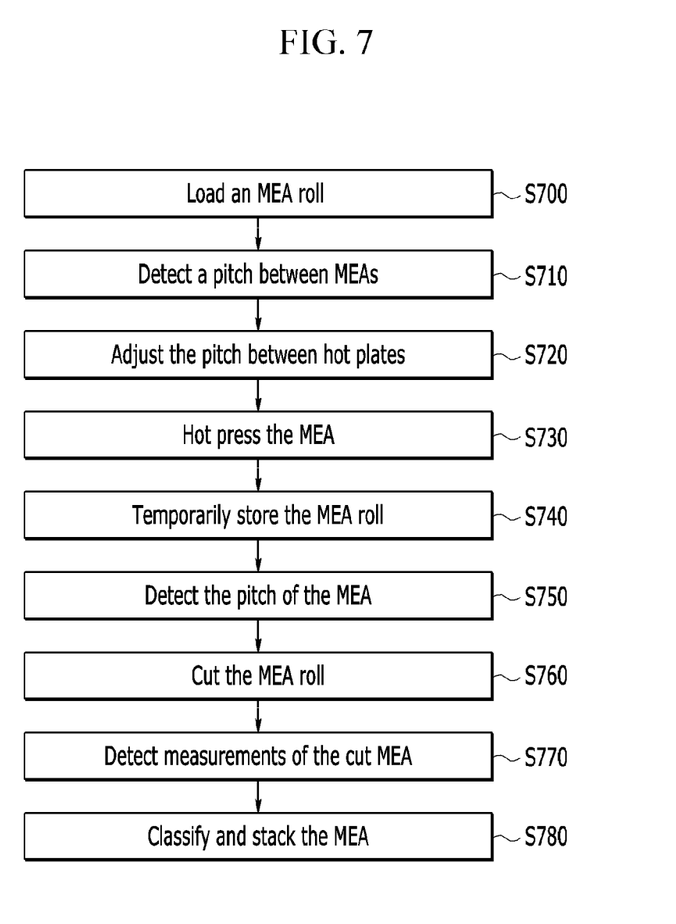
FIG. 7 is a flowchart showing a manufacturing method of the membrane electrode assembly manufacturing device.

FIG. 7 is a flowchart showing a manufacturing method of a membrane electrode assembly manufacturing device.

Referring to FIG. 7, the unwinder roller 100 may be unwound, and the MEA roll 199 may be loaded to an entrance side of the hot press apparatus 610 at step S700. The MEA roll 199 then may enter the hot press apparatus 610.

A pitch of the membrane electrode assembly 110 may be detected by the first position detecting sensor 115a at step S710.

A position of the hot plate 135 may be adjusted according to the detected pitch of the membrane electrode assembly 110 at step S720. Here, the variable pitch portion 120 may control at least one position of the hot plates 135 according to the pitch of the membrane electrode assembly 110.

The membrane electrode assembly 110 may be hot pressed by using the hot plate at step S730. Here, hot plates 135 having varied pitches may press the membrane electrode assembly 110.

The MEA roll 199 may be drawn out from the hot press apparatus 610 and be temporarily stored at step S740. The buffer roller moving portion 155 may move the buffer roller 150 downwardly to temporarily store the MEA roll 199 drawn out from the hot press apparatus 610 and maintain tension of the MEA roll 199.

The second position detecting sensor 115b may detect the pitch of the membrane electrode assembly 110 formed on the MEA roll 199 drawn out from the buffer apparatus 615 at step S750, and the cutting apparatus 620 may cut the membrane electrode assembly 110 at step S760.

The measurement detecting sensor 185 may detect measurements or the shape of the cut membrane electrode assembly 110 at step S770. The unloading gripper 190 then may classify the membrane electrode assembly 110 according to the detected measurements or shape and stacks it on the stack apparatus at step S780.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A membrane electrode assembly manufacturing method, the method comprising:
   loading an MEA (membrane-electrode assembly) roll on which a membrane electrode assembly is arranged;
   hot pressing an area corresponding to the membrane electrode assembly arranged on the loaded MEA roll;
   cutting the hot pressed membrane electrode assembly arranged on the loaded MEA roll;
   unloading the cut membrane electrode assembly to stack it on a stack apparatus;
   detecting a pitch of the membrane electrode assembly disposed on the loaded MEA roll; and
   adjusting a pitch of a hot plate of a hot press apparatus according to the detected pitch of the membrane electrode assembly,
   wherein the hot press apparatus includes:
      the hot plate for pressing the membrane electrode assembly at a set temperature;
      a position detecting sensor for detecting the pitch of the membrane electrode assembly disposed on the loaded MEA roll; and
      a variable pitch portion configured to vary a position of the hot plate according to the pitch of the membrane electrode assembly detected by the position detecting sensor, and
   wherein the hot plate includes:
      a variable hot plate and a reference hot plate disposed in a moving direction of the loaded MEA roll by a predetermined pitch,
      wherein the variable pitch portion adjusts a position of the variable hot plate with reference to the reference hot plate, and the reference hot plate and the variable hot plate press the membrane electrode assembly at the same time.

2. The method of claim 1, further comprising:
   cutting the hot pressed membrane electrode assembly according to the detected pitch of the membrane electrode assembly.

3. The method of claim 2, further comprising:
   detecting a measurement of the cut membrane electrode assembly; and
   classifying and loading the cut membrane electrode assembly according to the detected measurement of the cut membrane electrode assembly.

4. The method of claim 1, further comprising:
temporarily storing the loaded MEA roll on which the hot pressed membrane electrode assembly is arranged.

* * * * *